3,094,838
THRUST CONTROL SYSTEM
Frederick P. Evans, West Hartford, Conn., assignor to United Aircraft Corporation, East Hartford, Conn.
Filed June 17, 1959, Ser. No. 821,068
7 Claims. (Cl. 60—35.6)

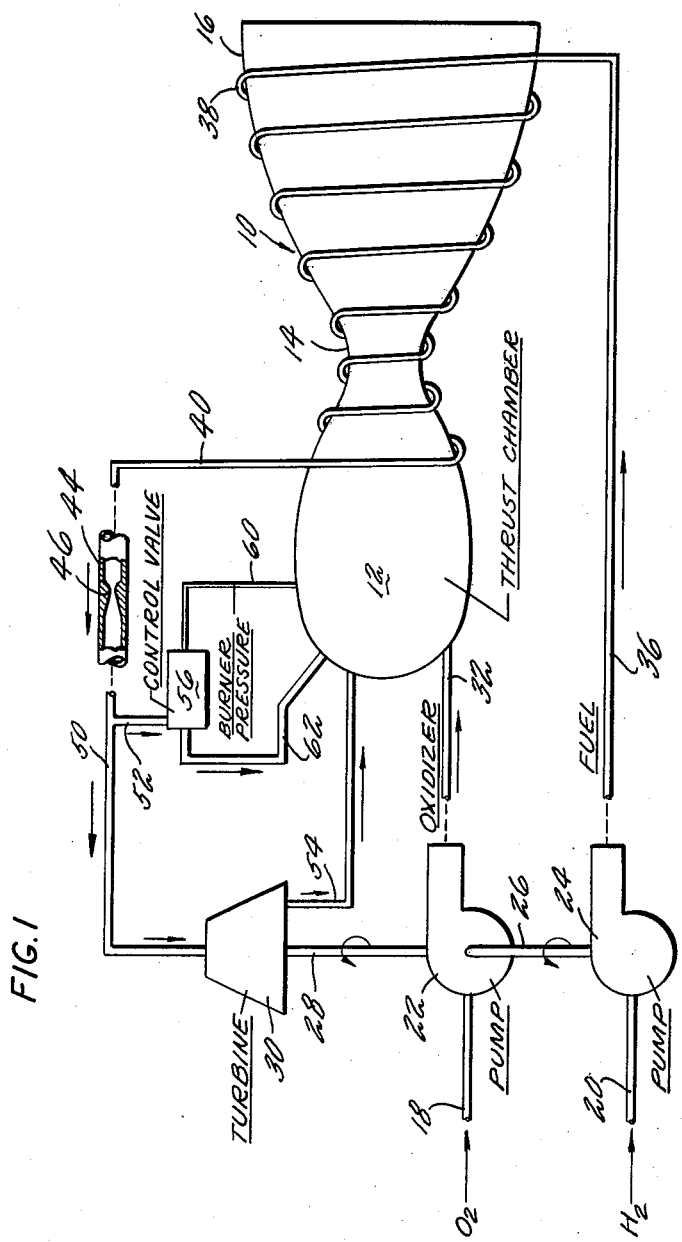

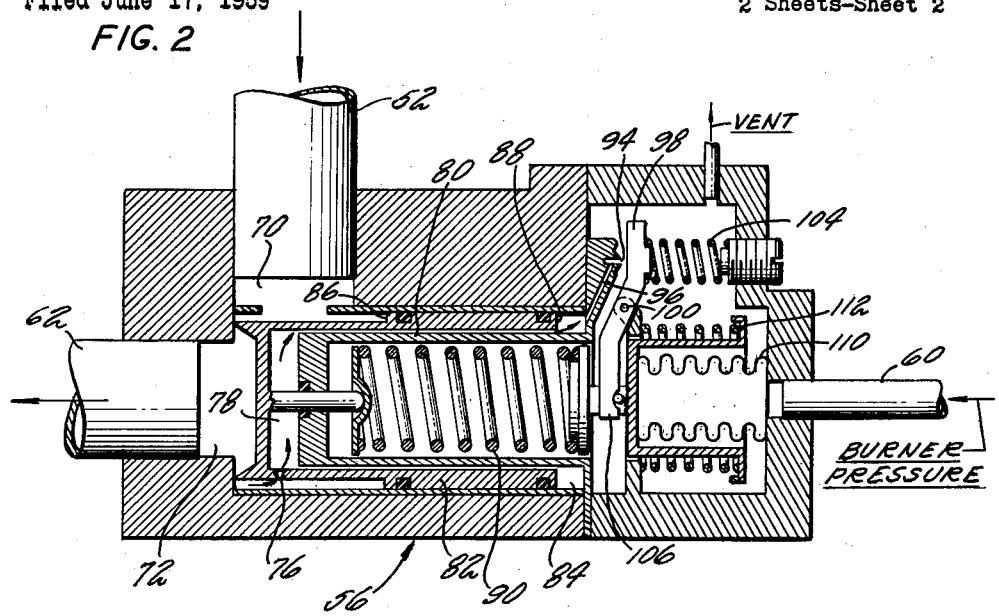

This invention relates to a fluid control system and more particularly to a fuel and pump control arrangement for rockets.

It is an object of this invention to provide a fuel control system for a rocket thrust chamber which will maintain a substantially constant thrust and provide stable control over a range of transient conditions.

It is a more specific object of this invention to provide in combination with a fuel pump, a gas turbine for driving the pump, which turbine is driven by the gaseous fuel, and a control valve which regulates the speed of the turbine by bypassing fuel around the turbine. To provide control stability, a choked venturi is located in the fuel line upstream of the turbine and control valve so that any pressure disturbances resulting from the controlling action of the valve are not propagated upstream of the venturi. As a result, under fixed temperature conditions, the total flow of fuel is established only by fuel pressure upstream of the venturi, which pressure is established by the pump speed. These and other objects of this invention will become readily apparent from the following detailed description of the drawings in which:

FIG. 1 is a schematic illustration of a rocket and a fuel and oxidizer system therefor; and FIG. 2 is an enlarged cross section of the bypass valve of FIG. 1.

Referring to FIG. 1, a rocket engine is generally illustrated at 10 as being a thrust or combustion chamber 12, a nozzle throat 14, and an exhaust chamber 16. Fuel and oxidizer of any suitable type may be utilized. However, a source of liquid oxygen is fed via pipe 18 and liquid hydrogen is supplied under a suitable pressure through a conduit 20. The oxygen is driven by a pump 22 while the hydrogen is driven by a suitable pump 24 both interconnected by a shaft 26 which is driven in turn by a shaft 28 leading from a power turbine 30. The oxidizer may be fed through a line 32 directly to the throat or combustion chamber 12 or, if desired, a suitable flow regulating mechanism may be incorporated in the line 32.

Fuel from the hydrogen pump 24 is fed through the line 36 to a wrap-around heat exchanger 38 which cools the exhaust nozzle of the rocket engine. Upon leaving the heat exchanger 38, the fuel passes through the conduit 40 in a gaseous state. In this gaseous state, the hydrogen fuel acts as a compressible fluid and flows through the venturi 44 which is so dimensioned that under design conditions the throat 46 is choked. Under choked conditions, the flow through the throat 46 will reach sonic velocity. The flow will then diffuse and slow down to subsonic velocity at the diffuser exit. The pressure will rise during this diffusion so that the over-all pressure drop across the venturi is relatively small. In this manner, serious pressure head losses in the flow system are not experienced. An ordinary restriction might be used, but under choked conditions pressure head losses would be excessive.

Downstream of the venturi 44 the fuel flows through two parallel paths 50 and 52. The path 50 leads to the turbine 30 so that the fuel is expanded therethrough and exhausted at the downstream side of the turbine through a pipe 54. The speed of the turbine and consequently the speed of pumps 22 and 24 is controlled by the amount of fuel passed through the pipe 50 and expanded through the turbine. To regulate the amount of fuel flow through the pipe 50 and the turbine 30, a bypass control valve 56 is provided. The particular control valve is fully described hereinafter in connection with FIG. 2.

The control valve 56 senses the pressure in the burner or thrust chamber 12 via the line 60 to maintain a desired thrust output of the rocket 10. The control valve 56 will bypass more or less fuel through the line 52 and its exhaust line 62 directly into the combustion chamber thereby regulating the amount of fuel being passed through the turbine via the line 50.

In varying the amount of fuel bypassed around the turbine 30 the valve 56 will vary the pressure in the line 52 and the line 50 on the downstream side of the venturi 44. Ordinarily, without the venturi, a variation in pressure in the lines 52 and 50 would result in a corresponding temporary increase or decrease in weight of fuel flowing to the combustion chamber 12. If the response of the turbine 30 were slow compared to the response of the bypass valve 56, the pump speed would change very little in the time required for the pressure change in combustion chamber 12. This pressure change would, therefore, cause a condition resulting in further bypass valve motion and further aggravation of the pressure error in the chamber 12. Eventually, the time lag of the turbine would be passed and the pressure in the combustion chamber might stabilize. But prior to this stable condition, a serious overshoot of combustion chamber pressure could be felt. The purpose of the venturi 44 is to avoid the overshoot and probable instability described above.

A choked venturi displays a characteristic that the volume of gas flow through it will remain unchanged regardless of downstream pressure fluctuations. This characteristic is used by the system shown in FIG. 1 to insure a constant weight flow of fuel to the combustion chamber 12 regardless of the opening or closing of the bypass valve 56. The pressure of the combustion chamber 12 can be expected to remain constant if the weight of fuel flowing into it is held constant. The potential energy of pressure head of the fuel is negligible compared to its chemical potential energy. Thus, the incorporation of the choked venturi 44 avoids the pressure overshoot attendant to the system not incorporating the venturi. Further, the very low pressure head loss of a well-designed venturi insures maximum power deliverable to the pump turbine when the bypass valve is completely closed.

The control valve 56 is shown in more detail in FIG. 2. The valve 56 is provided with a feedback feature which causes the valve to stabilize at a new position under each new condition and has a built-in droop feature. As seen in FIG. 2, the valve 56 has an inlet 70 leading from the line 52 (see FIG. 1) and an outlet 72 leading to the line 62 which leads directly to the combustion chamber 12 (see FIG. 1). Fuel from the inlet side 70 of the valve can flow through the fixed orifice 76 into the chamber 78. This chamber leads through the annular passage 80 which surrounds the piston 82 into a modulated pressure chamber 84 on the top side of the piston 82.

Valve inlet pressure from the inlet 70 acts on a relatively small area 86 of the valve 80 while the modulated pressure in the chamber 84 acts on a relatively large area 88 of the piston 80. High pressure acting on the area 86 tends to move the valve piston 82 toward an open direction, while the spring 90 and the modulated pressure in the chamber 84 acting on the relatively larger area 88 tend to close the valve. The pressure in the chamber 84 is controlled by a variable orifice 94 which is connected to the chamber 84 via a drilled passage 96. A flapper 98 varies the opening of the orifice 94 and is pivoted intermediate its ends at 100. As the flapper 98 opens the orifice 94, the pressure in the chamber 84 is reduced and vented to a suitable low pressure by a vent 102. The flapper 98 is biased toward a closed position by an adjustable spring 104.

The end 106 of the flapper 98 is connected to a bellows 110 suitably biased by a spring 112. The inside of the bellows is connected to the rocket thrust chamber via the line 60. The thrust chamber or burner pressure is sensed by the bellows 60 so as to provide a controlling signal to move the flapper 98 and vary the opening of the orifice 94. Variation of the opening of the orifice 94 controls the position of the valve piston 82 to open or close the bypass.

The position of the bypass valve piston 82 will then vary the amount of flow through the line 50 seen in FIG. 1.

The spring 90 feeds back the position of the valve piston 82 to the flapper 98 to provide a droop function and set the valve and flapper in a null position.

With the particular valve arrangement shown, which valve responds to burner pressure and more particularly with the venturi shown in FIG. 1, a constant thrust fuel regulator is provided which will be very stable and highly accurate.

Therefore, as a result of this invention, it is apparent that a very simple and stable fuel control for a rocket power plant is provided.

Although only one embodiment of this invention has been illustrated and described, it will be apparent that various changes and modifications may be made in the arrangement and construction of the various parts without departing from the scope of this novel concept.

What it is desired by Letters Patent is:

1. A combustion system including a combustion chamber, a supply of fuel, means for pressurizing said fuel comprising a pump, a turbine for driving the pump, means for adding energy to said fuel conduit means for conducting fuel from said adding means to said turbine, a bypass valve connected to said conduit means for conducting fuel around said turbine thereby to regulate the amount of fuel passing through said turbine, said turbine exhausting fuel to said combustion chamber, and a restriction in said conduit means which operates choked for preventing temporary fuel flow overshoot caused by the regulating effects of said bypass valve and located upstream of the connection of said valve to said conduit means.

2. A combustion system including a combustion chamber, a supply of fuel, means for pressurizing said fuel comprising a pump, a turbine for driving the pump, means for adding energy to said fuel, conduit means for conducting fuel from said adding means through said turbine, a bypass valve connected to said conduit means for conducting fuel around said turbine thereby to regulate the amount of fuel passing through said turbine, said turbine and said valve exhausting fuel to said combustion chamber, and a venturi in said conduit means which operates choked for preventing temporary fuel flow overshoot caused by the regulating effects of said bypass valve, said venturi being located upstream of the connection of said valve to said conduit means.

3. In a combustion system according to claim 2 including means responsive to the pressure in said combustion chamber for regulating said bypass valve.

4. In a combustion chamber according to claim 3 wherein said bypass valve includes means having a droop-type feedback characteristic.

5. In a fluid flow system including a fluid consuming device, a source of fluid, means receiving fluid from said source and adding energy thereto, a pump for pumping fluid from said source to said receiving means and device, a turbine receiving fluid from said receiving means and driving said pump, means for regulating the amount of fluid pumped from said source to said device including conduit means containing a valve for regulating the amount of fluid passing to said turbine, and a restriction in said conduit means upstream of said valve and turbine for preventing temporary fluid flow overshoot caused by the regulating effects of said valve, said restriction normally operating choked.

6. In a fluid flow system including a fluid consuming device, a source of fluid, means receiving fluid from said source and adding energy thereto, a pump for pumping fluid from said source to said receiving means and device, a turbine receiving fluid from said receiving means and driving said pump, means for regulating the amount of fluid pumped from said source to said device including conduit means having fluid bypass means, said bypass means including a valve for regulating the amount of fluid passing to said turbine and having a fluid connection to said device, means responsive to a variable of operation of said device for controlling said valve, and a restriction in said conduit means upstream of said valve and said turbine, said restriction operating choked under normal output conditions of said pump for preventing temporary fluid flow overshoot caused by the regulating effects of said valve.

7. A rocket having a combustion chamber, a source of hydrogen fuel, means receiving fuel from said source and adding energy thereto, a pump for pumping said fuel from said source to said means receiving fuel, a turbine receiving said fuel from said receiving means and driving said pump, means for regulating the amount of fuel pumped from said source including conduit means containing valve means for regulating the amount of fuel passing to said turbine, said valve means directing a part of the fuel directly to said combustion chamber, and a restriction in said conduit means upstream of said valve and said turbine for preventing temporary fuel flow overshoot caused by the regulating effects of said valve, said restriction normally operating choked.

References Cited in the file of this patent

UNITED STATES PATENTS

| 1,310,253 | Shuman | July 15, 1919 |
| 2,479,888 | Wyld et al. | Aug. 23, 1949 |
| 2,483,045 | Harby | Sept. 27, 1949 |
| 2,620,625 | Phaneuf | Dec. 9, 1952 |
| 2,689,454 | Schneider | Sept. 21, 1954 |
| 2,704,438 | Sheets | Mar. 22, 1955 |
| 2,922,050 | Loughran | Jan. 19, 1960 |
| 2,979,891 | Widell | Apr. 18, 1961 |
| 2,992,527 | Masnik et al. | July 18, 1961 |

OTHER REFERENCES

Rocket Propulsion Elements, Second Edition, by George P. Sutton, published by John Wiley & Sons Inc., N.Y., N.Y., 1956, pages 298 and 299.